A. ORTMAYER.

GIG SADDLE.

No. 10,055. Reissued Mar. 7, 1882.

Witnesses.
Henry Fauchhuter,
M. B. Johnson

Inventor.
Andrew Ortmayer
per. F. F. Warner his
Attorney.

N. PETERS. Photo-Lithographer, Washington, D. C.

UNITED STATES PATENT OFFICE.

ANDREW ORTMAYER, OF CHICAGO, ILLINOIS.

GIG-SADDLE.

SPECIFICATION forming part of Reissued Letters Patent No. 10,055, dated March 7, 1882.

Original No. 162,095, dated April 13, 1875; Reissue No. 6,969, dated February 29, 1876. Application for reissue filed September 27, 1881.

*To all whom it may concern:*

Be it known that I, ANDREW ORTMAYER, of Chicago, in the county of Cook and State of Illinois, have invented certain new and useful Improvements in Gig-Saddles, of which the following is a specification.

Heretofore, so far as I am aware, the padding of gig-saddles has been so applied thereto as to be incapable of being removed either without being destroyed, injured, or rendering either complete or partial unmaking and remaking necessary, or without first separating or disconnecting some of the parts of the structure to which the padding is connected.

For the purpose of avoiding these objections, and not only facilitating the work of construction, but rendering it comparatively easy to change the nuts and make repairs, my invention consists of a gig-saddle in which are combined a pad consisting of a complete or integral article of itself, adapted to be applied and removed without structural change or alteration, and a part containing removable nuts and left bare or unstuffed next to the said pad, so as to render the said nuts easily accessible.

My invention also consists of certain details of construction relating to the pad and nut-pockets, all substantially as hereinafter set forth.

Figure 1:
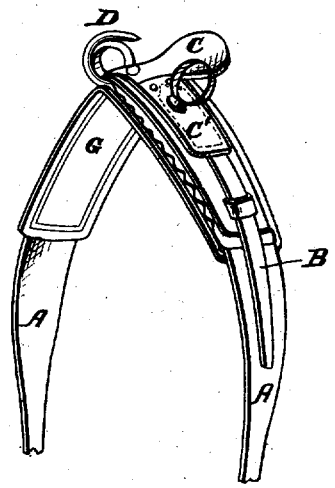
Figure 2:
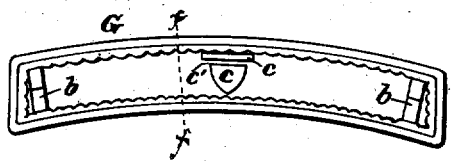
Figure 3:
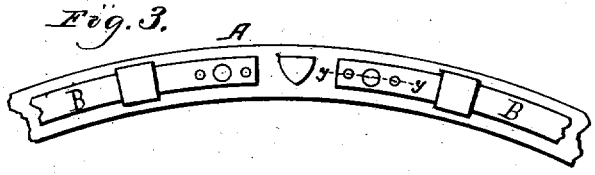
Figure 4:
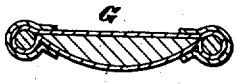
Figure 5:
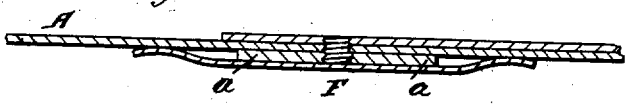

Figure 1 is a perspective view of my improved gig-saddle and pad. Fig. 2 is a plan view of the pad. Fig. 3 is a plan view of the skirt. Fig. 4 is a cross-section of the pad, taken at the line *x x* of Fig. 2; and Fig. 5 is a longitudinal section taken at the line *y y* of Fig. 3, and showing one of the removable terret-nuts located in its pocket in the skirt.

A A represent the skirts, and B B the billets, each billet consisting of one piece of leather, and being secured by rivets and loops to the skirts.

C is the metal jockey, to which the check-hook D is secured. The jockey has two wings, C′, which project over the billets a little farther than the terret-rings, the bolts of which pass through the wings near the ends of the latter. These bolts also pass through holes in the billets and skirts, and are screw-threaded at their lower ends, and these ends enter plates or nuts *a a*, secured in pockets on the under side of the skirts. These plates are of considerable size, and each has a female screw near its center to receive the terret-screws, and performs the functions of a nut with relation to the screw which enters it. These plates are also kept in place and are covered and concealed by leather covers F, stitched to the under side of the skirts.

It has been the custom in completing a saddle to form a pad to fit the tree and to attach the pad permanently thereto. With my saddle, however, it is only necessary to use a removable pad, G, which is cut or slotted, as shown at *c c*, so as to form a loop, *c′*, adapted and arranged to receive the hook D, and thus fasten the pad to the saddle at that point, but admitting of the easy removal of the pad. The pad may also be hung to the skirts by loops *b b* in the ordinary manner. By this manner of using only a removable pad and of fastening the terret-bolts, in case one should break, it can be replaced without ripping the saddle, and the removable pad, by having therein the loop *c′*, is held steadily in its place.

In forming the loop *c′*, I deem it preferable to make the rear slot sufficiently large, as shown, to receive the screw and nut on the check-hook. The said screw and nut are thus allowed to enter the stuffed part of the pad, and by this means they are prevented from pushing the pad downward away from the saddle, as they would do if they rested against the upper face of the pad. Also, when the gig-tree and the removable pad are combined with skirts containing pockets for the terret-nuts the gig-saddle is rendered simple, durable, safe, and comfortable.

I am aware that removable supplemental or repair pads have heretofore been employed in connection with gig-saddles having pads permanently attached thereto, and that gig saddles have also heretofore contained pockets for the terret-nuts. I am also aware that padding has heretofore been permanently attached to such parts of a gig-saddle as were detachable from the other parts thereof, so that the detachable parts, with the padding remaining thereon, could be removed. I do not, therefore, here intend to claim such features of construction broadly; but,

Having thus described my invention, what I claim as new, and desire to secure by Letters Patent, is—

1. The combination, substantially as hereinbefore specified, of a removable pad with an unstuffed gig-saddle containing removable nuts located above the said pad, for the purposes set forth.

2. The combination, substantially as hereinbefore specified, of a removable pad consisting of a complete article of itself, and capable of attachment and removal without structural change or alteration, and an unstuffed gig-saddle containing removable terret-nuts supported by pockets arranged for exposure and for access to the said nuts when the said pad is removed, for the purposes set forth.

3. In a gig-saddle, the combination, with the metal jockey, of the skirts A A, provided with the pockets F F to secure the terret plates or nuts *a a*, substantially as specified.

4. In combination, the metal jockey provided with the check-hook D, fastened thereto by means of a nut on the under side of the jockey, and the removable pad G, having an opening in its upper face to allow the said nut and the bolt of the hook to enter the padding of the pad, substantially as and for the purposes specified.

5. The combination, in a gig-saddle, of the check-hook D, with the removable pad G, having therein the loop *c'*, adapted and arranged to receive the check-hook, and extending across the forward end of an opening adapted and arranged to receive the nut and screw of the check-hook when the pad is fastened to the latter by means of the said loop, substantially as and for the purposes specified.

ANDREW ORTMAYER.

In presence of—
F. F. WARNER,
HENRY FRANKFURTER.